US007011582B1

(12) United States Patent
Yamamoto

(10) Patent No.: US 7,011,582 B1
(45) Date of Patent: Mar. 14, 2006

(54) GAME APPARATUS AND COMPUTER-READABLE MEDIUM

(75) Inventor: Takeyasu Yamamoto, Tokyo (JP)

(73) Assignee: NAMCO Ltd., Tokyo (JP)

(*) Notice: Subject to any disclaimer, the term of this patent is extended or adjusted under 35 U.S.C. 154(b) by 732 days.

(21) Appl. No.: 09/261,165

(22) Filed: Mar. 3, 1999

(30) Foreign Application Priority Data

Mar. 6, 1998 (JP) ................................. 10-073118

(51) Int. Cl.
A63F 13/00 (2006.01)
(52) U.S. Cl. ............................... 463/31; 463/2; 463/15
(58) Field of Classification Search .................... 463/1, 463/2, 15, 31, 49, 50–53
See application file for complete search history.

(56) References Cited

U.S. PATENT DOCUMENTS 4,738,451 A * 4/1988 Logg .............................. 463/2
4,976,438 A * 12/1990 Tashiro et al. .................. 463/2
5,569,085 A * 10/1996 Igaarashi et al. ............. 463/49

OTHER PUBLICATIONS

Busey, Andrew, "Secrets of the MUD Wizards", Sams.net Publishing 1995 ISBN 0-672-30723-5 pp 3-9, 11-23, 28-30, 44-48, 115-121, 126-132, 144-150, 175-177, 1995.*
Advertising Brochure for Gauntlet, unknown.*
Advertising Brochure for Gauntlet Legends, 1998.*
The Dot Eaters—Player4 Stage2—Classic video game history. downloaded from [www.enuunlim.com/doteaters/play4sta2.htm] on Aug. 27, 2001. date of authorship unknown: discussion of known 1980's—1994 games.*
Waring, Robert E., DOOM Totaly Unauthorized Tips and Secrets, Brady Publishing, Indianapolis, IN 1994.*
The Dark Heart of UUKRUL Players Guide, Digital Studios, 1989.*
Playguide for Ultima Online, by Origin/Electronic Arts, pp 42, 43, 76-81 and 83-85.*
The Official Guide to Ultima Online, by Origin/Electronic Arts pp 22, 23, 26, 27 and reference guide pp 1-2, released 1997.*
DIABLO Game players guide, Blizzard Entertainment, released Dec. 1, 1996.*
Busey, Andrew, "Secrets of the MUD Wizzards", Sams.net Publishing 1995, p486.*
Kein Durchang! Review of Wolfenstein 3D game from [www.swallows.demon.co.uk/arc/reviews/wolfenstein.html], last modified Aug. 31, 1996.*

* cited by examiner

Primary Examiner—Jessica J. Harrison
(74) Attorney, Agent, or Firm—Oliff & Berridge, PLC

(57) ABSTRACT

A game apparatus for causing a player's character controlled by a player to fight against an enemy character within a predetermined game space. The game apparatus includes a storage section for storing data of items held by the respective characters, an item computing section and a character reviving section for reviving a defeated character within the game space under a predetermined condition. The item computing section selects prize items from items held by the defeated character in accordance with a predetermined rule and displays the prize items on a display means. The item computing section adds the prize items to items held by a character who acquires said prize item, subtracts the prize items from items held by the defeated character in accordance with a predetermined rule, and updating the data of items in the storage section according to the results of addition and subtraction.

12 Claims, 12 Drawing Sheets

ATTACK

MEDALS APPEAR

NOW PLAYER'S CHARACTER CAN GET MEDALS

PASS THROUGH MEDAL IMAGES TO GET THEM

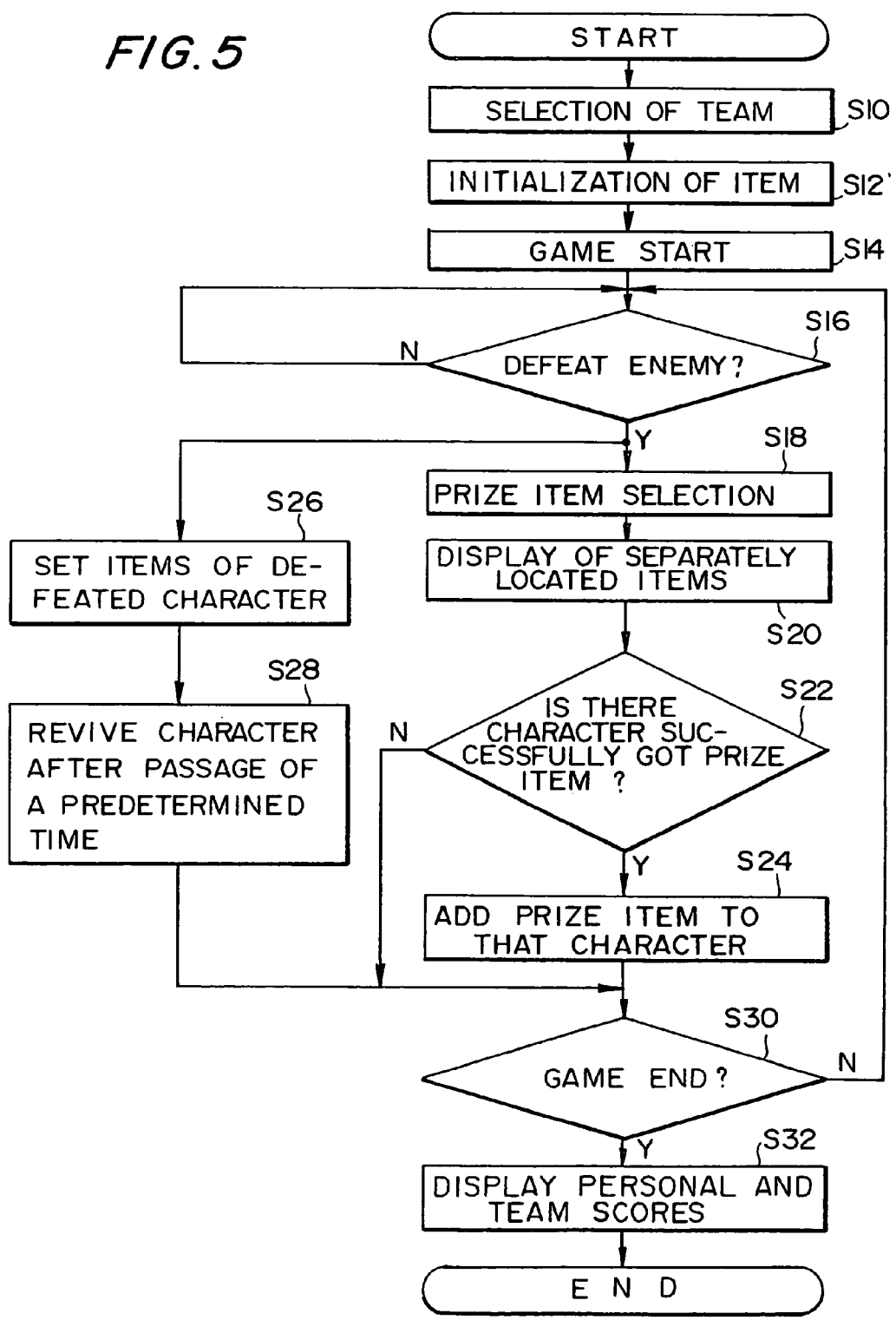

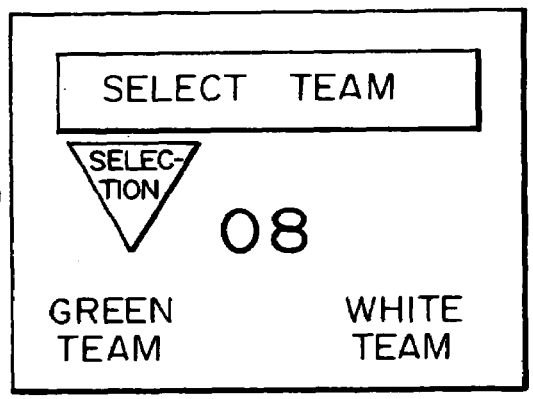
FIG.6A — TEAM SELECTION
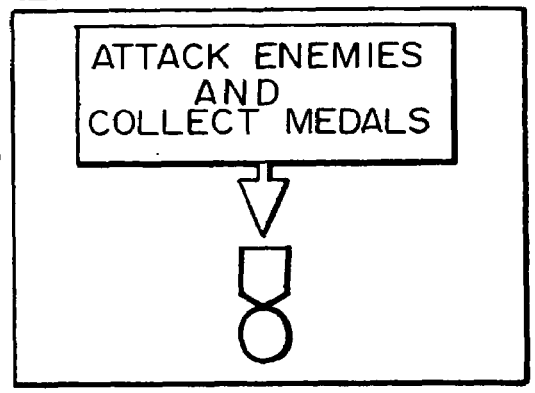
FIG.6B — INSTRUCTIONS
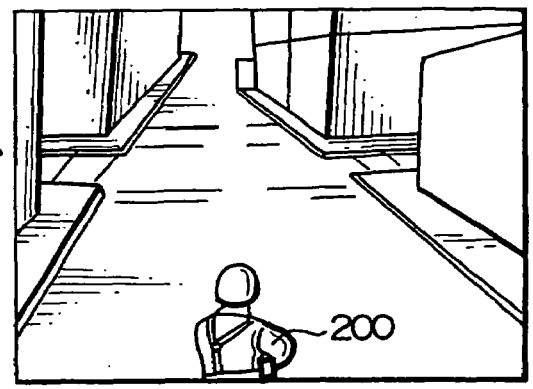
FIG.6C — GAME START
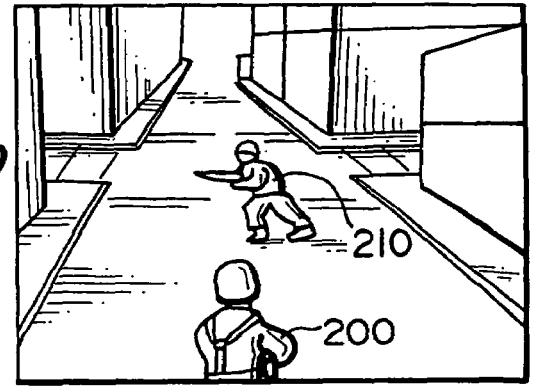
FIG.6D — FIND SOLDIER IN ENEMY TEAM

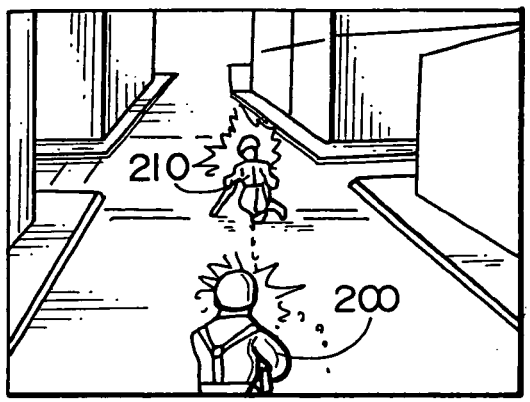
FIG.7A  ATTACK
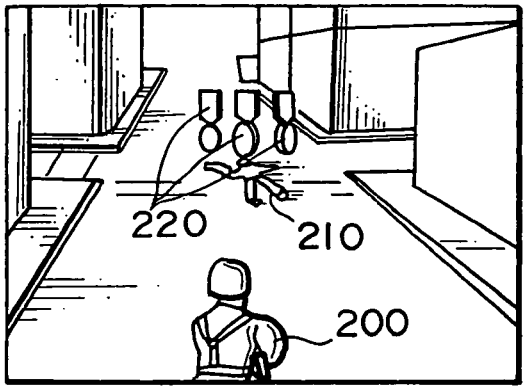
FIG.7B  MEDALS APPEAR
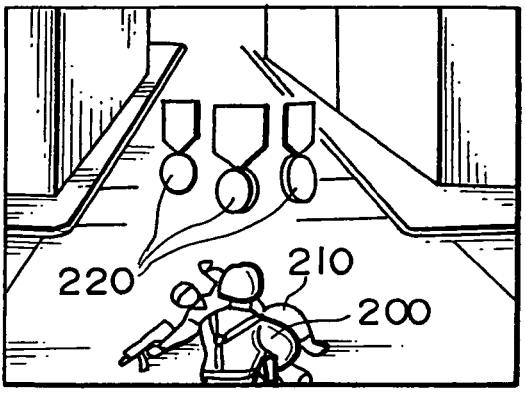
FIG.7C  NOW PLAYER'S CHARACTER CAN GET MEDALS
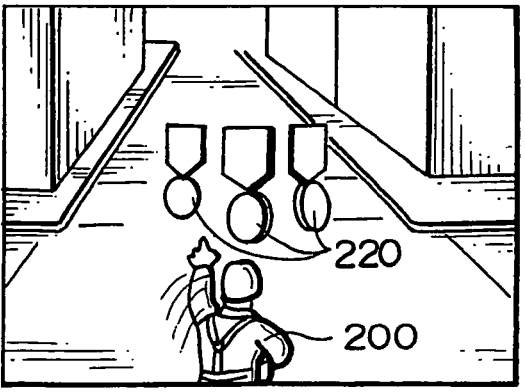
FIG.7D  PASS THROUGH MEDAL IMAGES TO GET THEM

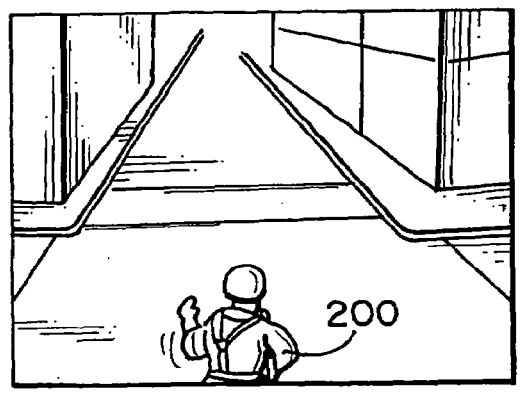
FIG.8A  GOT ENEMY'S MEDALS
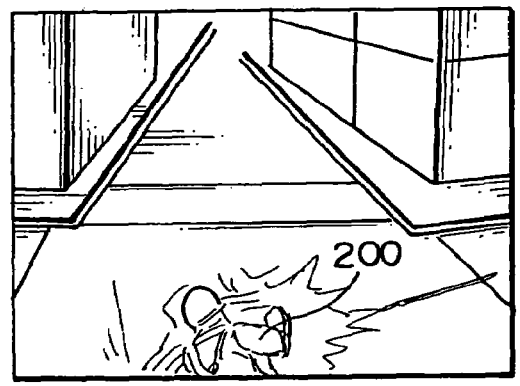
FIG.8B  SUDDENLY ATTACKED
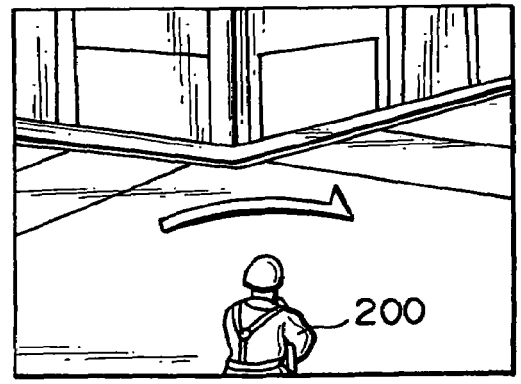
FIG.8C  TURN RIGHT
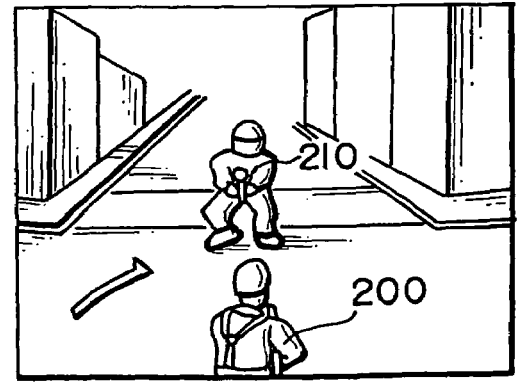
FIG.8D  ENEMY SOLDIER APPEARS

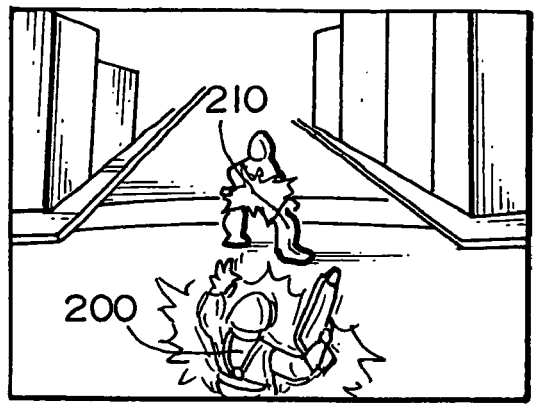
FIG. 9A — DEFEATED BY ENEMY SOLDIER
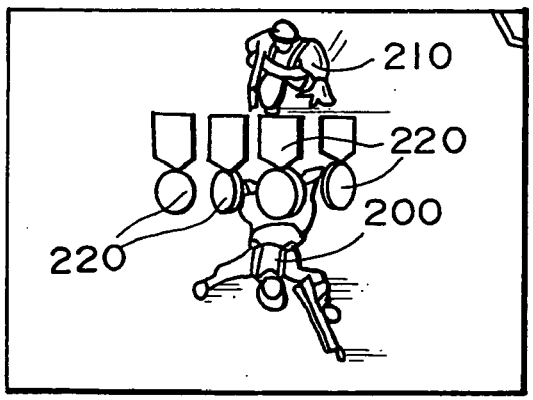
FIG. 9B — ENEMY SOLDIER MOVES OVER PLAYER'S CHARACTER
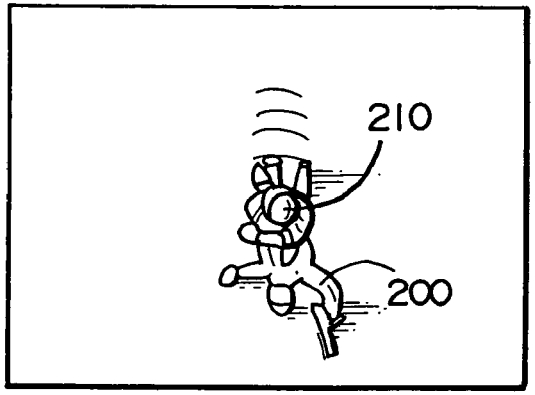
FIG. 9C — PLAYER'S MEDALS ARE TAKEN AWAT
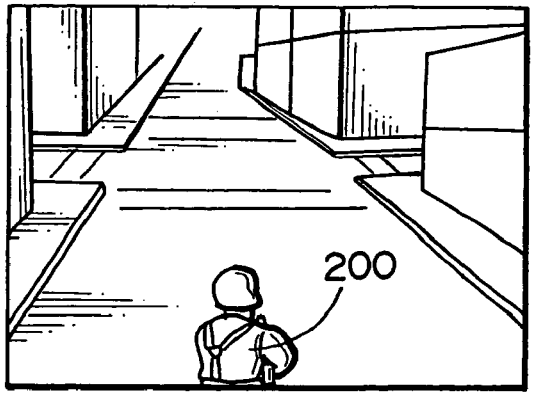
FIG. 9D — RESTART FROM REVIVAL POINT

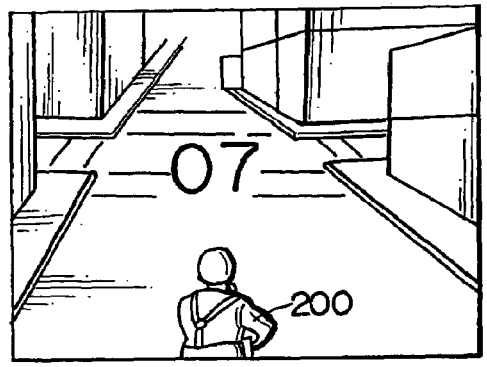
FIG.10A — JUST BEFORE THE END OF THE GAME. TIME IS COUNTED DOWN ON DISPLAY
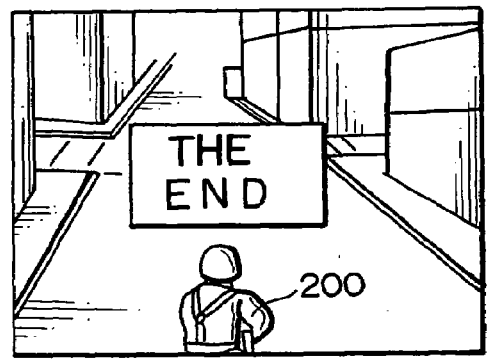
FIG.10B — THE END OF THE GAME
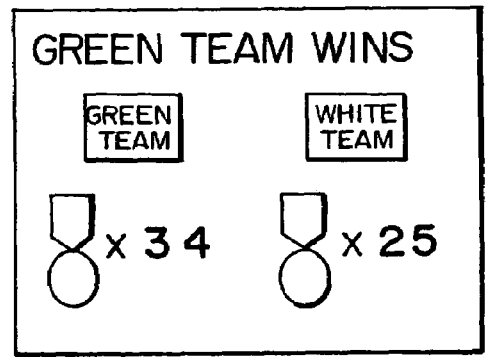
FIG.10C — TEAM SCORES
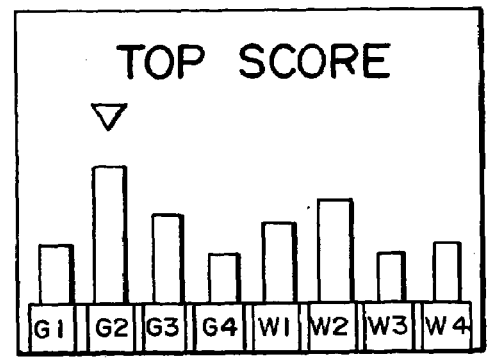
FIG.10D — PERSONAL SCORES

GAME APPARATUS AND COMPUTER-READABLE MEDIUM

BACKGROUND OF THE INVENTION

1. Field of the Invention

The present invention relates to a game apparatus for fighting against an enemy character within a predetermined game space and a computer-readable medium.

2. Description of Prior Art

There are known fighting type game machines in which a player controls its own character within a game space to fight against an enemy character.

However, many of these conventional game machines were simply designed to attack and compete against the enemy character for the score. Since such games tend to be dull, they are popular only at first, and soon become boring.

SUMMARY OF THE INVENTION

It is therefore an object of the present invention to provide a fighting type game apparatus in which the game does not easily become dull and can be enjoyed by players ranging from beginners to advanced players, and a computer-readable medium usable therein.

According to one aspect of the invention, there is provided a game apparatus in which a player's character controlled by a player fights against an enemy character within a predetermined game space, such as a predetermined three-dimensional (3D) game space, for example, the game apparatus comprising storage means for storing item data relating to items held by the player's and enemy characters; item computation means for selecting and displaying at least one prize item from items held by a defeated character in accordance with a predetermined rule after one of the player's and enemy characters has defeated the other, adding the prize item to items held by a character who acquires the prize item, subtracting the prize item from items held by the defeated character in accordance with a predetermined rule, and updating the item data in the storage means based on the results of addition and subtraction; and character revival control means for reviving the defeated character in the game space under a predetermined condition, wherein the player's and enemy characters compete for items.

The game apparatus of the present invention preferably comprises means for computing a game image wherein the player's character controlled by the player fights against the enemy character within the predetermined game space and display means for displaying the computed game image.

The item computation means preferably computes information for displaying the prize item on the display means.

According to the present invention, the player controls its own character to fight against the enemy character. The fighting mode may be selected such that the player and enemy characters have shooting devices for attacking and defeating each other. Alternatively, the game may be performed in a wrestling style.

If one of the characters has defeated the other, a prize item is selected from the items of the defeated character and displayed in the game space. Usually, this prize item is shown around the defeated character.

The winning character performs a predetermined item-acquiring action for the prize item. If the winning character has successfully performed this action, the acquired item will be added to the items held by the winning character.

In such a manner, each of the characters increases the number of the items held by itself each time when that character defeats the other character, or reduces the number of the items each time when it is defeated by the other character.

Thus, players can enjoy an item capturing game in addition to a fighting game for defeating each other in the form of character. Consequently, the game can further be improved in interest and will not easily be wearied through plural game plays. This can realize a game having an improved working ratio.

The item computation means may comprise:
  prize item selection means for selecting and displaying at least one prize item from items held by a defeated character in accordance with a predetermined rule after one of the player's and enemy characters has defeated the other;
  item addition means for updating the item data by adding the prize item to items held by a character who acquires the prize item; and
  item subtraction means for updating the item data by subtracting the prize item from items held by the defeated character in accordance with a predetermined rule.

According to another aspect of the present invention, there is provided a computer-readable medium for storing information for the game in which a player's character controlled by a player fights against an enemy character to compete for items within a predetermined game space, wherein the information comprises:
  first information for selecting and displaying at least one prize item from items held by a defeated character in accordance with a predetermined rule after one of the player's and enemy characters has defeated the other;
  second information for adding the prize item to items held by a character who acquires the prize item;
  third information for subtracting the prize item from items held by the defeated character in accordance with a predetermined rule; and
  fourth information for reviving the defeated character under a predetermined condition, items of the defeated character having been reduced.

The prize item selection means may display the prize item for a predetermined time; and the item addition means may add the prize item to items held by a character who has performed a predetermined item-acquiring action within the predetermined display time.

The first information may include information for displaying the prize item for a predetermined time; and the third information may include information for adding the prize item to items held by a character who has performed a predetermined item-acquiring action within the predetermined display time.

In such an arrangement, each of the players cannot get an item even when the character controlled by that player has defeated the other character and if the capturing action is not soon performed for the prize item displayed immediately after the player's character has defeated the enemy character. This can realize a more attractive game providing an improved feel of tension.

The prize item selection means may divide the prize items into a plurality of groups for displaying in a plurality of display areas; and the item addition means may add the prize items in the display areas indicated by a predetermined item-acquiring action performed by a character to items held by that character.

The first information may include information for dividing the prize items into a plurality of groups for displaying in a plurality of display areas; and the second information may include information for adding the prize items in the display areas indicated by a predetermined item-acquiring action performed by a character to items held by that character.

If a number of prize items are displayed in the same place when the player's character has defeated the enemy character, the item capturing action will extremely be simplified. According to the present invention, however, the item capturing action can be increased in difficulty since the prize items are separately displayed in the plural areas. This can improve the game in tension and interest.

Particularly, when a plurality of characters always exist in the game space and even though the player's character has slain the defeated character, a prize item to be captured will be gotten by another character if that prize item is soon displayed in one of the plural areas. According to the invention, therefore, the game capturing items held by the respective characters from each other can further be improved in tension. According to the invention, thus, a fighting game played by a plurality of players can be improved in working ratio since it will not be wearied by the players through many game plays and will be challenged by the players many times.

The prize item selection means may select the prize item from items held by the defeated character in the predetermined proportion; and the item subtraction means may set remaining items that have not been subtracted from items held by the defeated character as new items for the defeated character when the defeated character revives.

The first information may include information for selecting the prize item from items held by the defeated character in the predetermined proportion; and the third information may include information for setting remaining items that have not been subtracted from items held by the defeated character as new items for the defeated character when the defeated character revives.

The game apparatus of the invention may further comprise means for determining the ranks of the player's and enemy characters according to the number of items held by the characters at the end of the game.

In the computer-readable medium of the invention, the information for the game may further comprise information for determining the ranks of the player's and enemy characters according to the number of items held by the characters at the end of the game.

In such an arrangement, the item capturing type fighting game can be improved in tension and interest since the ranks of the respective players are determined based on the items captured and held by them.

When a plurality of players compete with each other by separating into ally and enemy teams, the game apparatus or the present invention may further comprise means for determining the result of the game according to the number of items held by the teams at the end of the game.

In the computer-readable medium of the present invention, the information for the game may further include:

information for causing a plurality of players to compete with each other by separating into ally and enemy teams; and information for determining the result of the game according to the number of items held by the ally and enemy teams at the end of the game.

In such an arrangement, the players can enjoy a team play. As a result, the players belonging to the same team can be increased in combination. This can realize a more attractive fighting game apparatus.

BRIEF DESCRIPTION OF THE DRAWINGS

FIG. 5 is a flowchart illustrating the operation of the embodiment of the game apparatus.

FIGS. 6A–6D illustrate various game images shown on the display section.

FIGS. 7A–7D illustrate various other game images.

FIGS. 8A–8D illustrate various other game images.

FIGS. 9A–9D illustrate various other game images.

FIGS. 10A–10D illustrate various other game images.

DETAILED DESCRIPTION OF THE PREFERRED EMBODIMENTS

A preferred embodiment of the present invention will now be described in connection with a shooting game apparatus.

Figure 1:
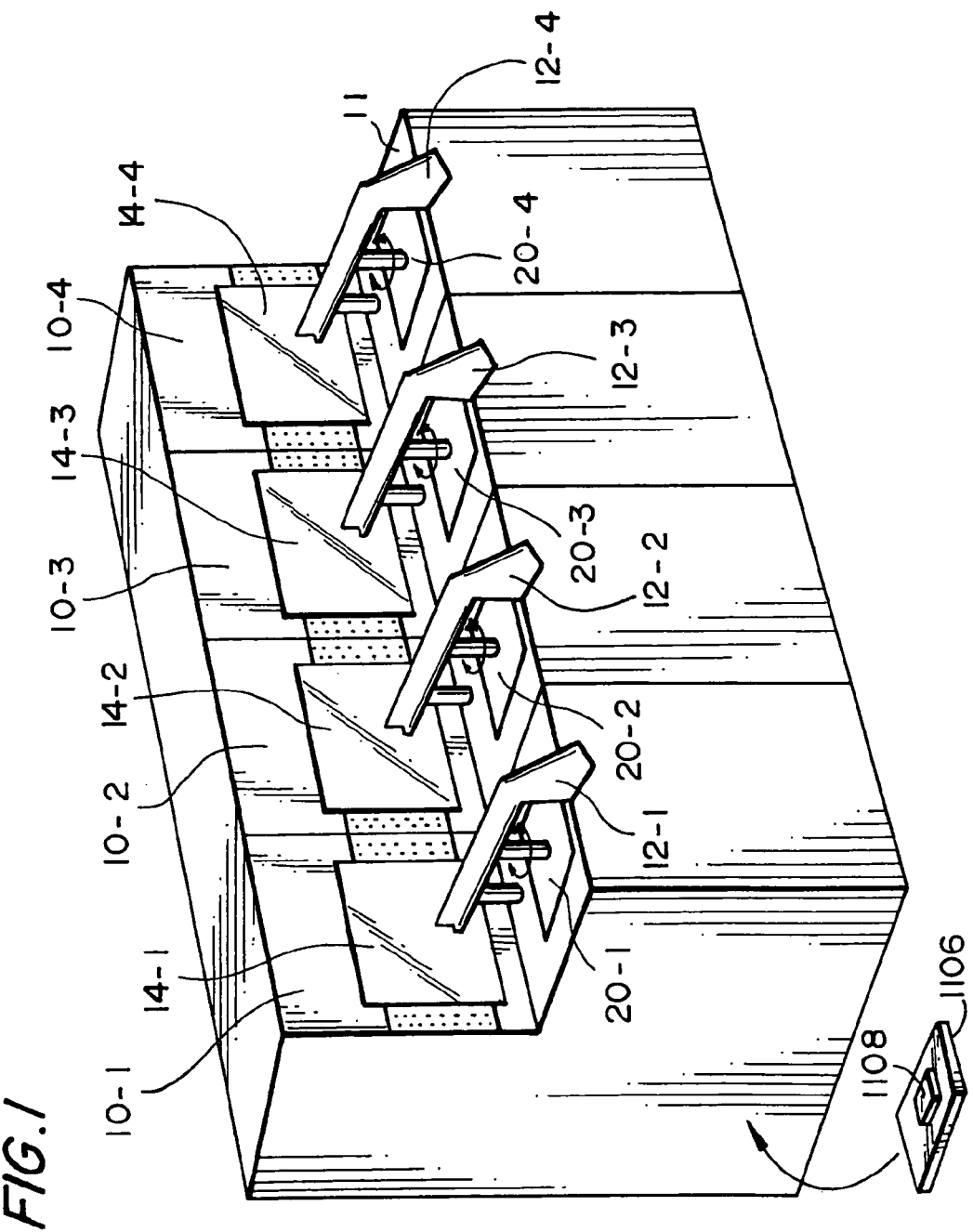
FIG. 1 is a perspective view of the embodiment of a game apparatus of the present invention.

FIG. 1 shows a preferred embodiment of shooting game apparatus according to the present invention.

This game apparatus comprises four interconnected game machines 10-1 to 10-4 including display sections 14-1 to 14-4 and shooting devices or machine guns 12-1 to 12-4. Thus, maximally four players can enjoy a shooting game in teams.

Each of the machine guns 12-1 to 12-4 is mounted on the corresponding one of movable mounts 20-1 to 20-4 which are in turn mounted on a base 11 forming part of a housing. The movable mounts can be slid horizontally to all directions and the machine guns can be turned around.

Figure 2:
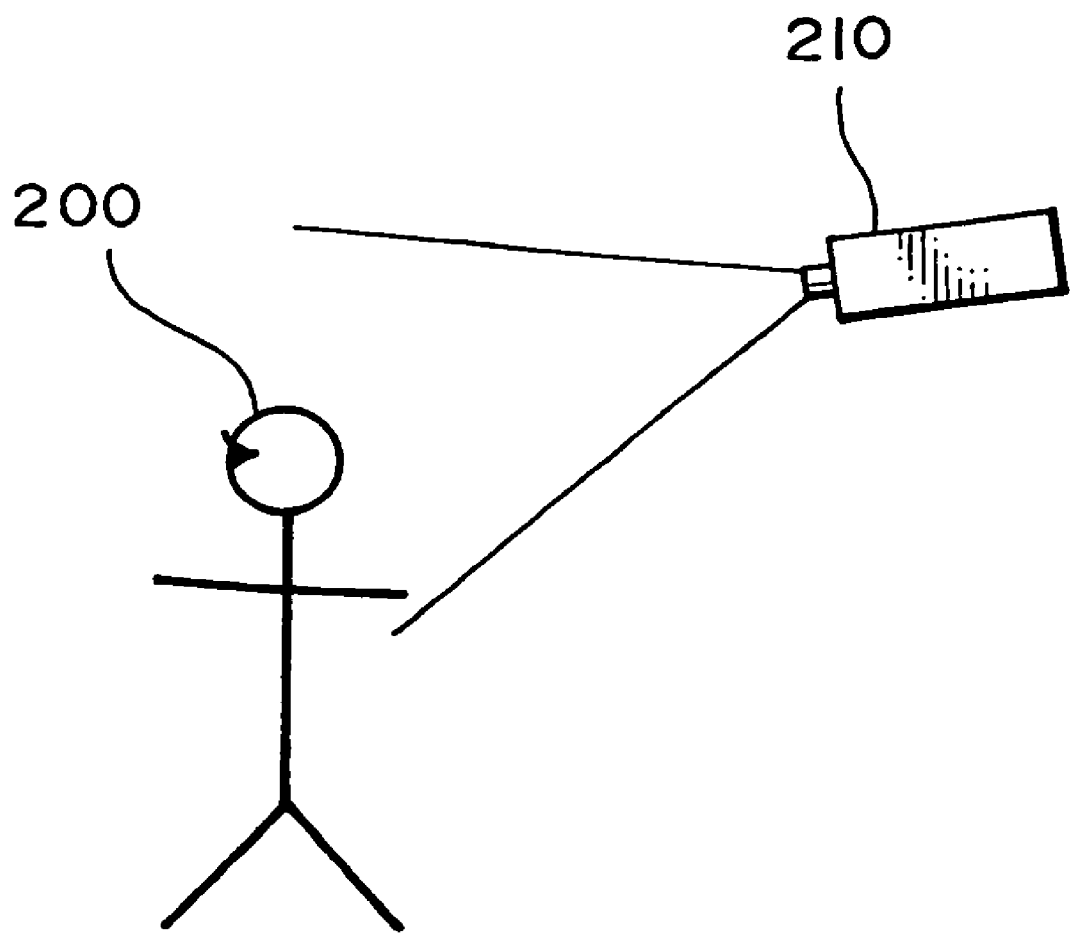
FIG. 2 is a view illustrating the relationship between a player's character object and a virtual camera.

FIG. 2 shows the relationship between a player's character object 200 movable in a three-dimensional object space or game space and a virtual camera 210 located relative to this character object 200 at its third-person's viewpoint. The virtual camera 210 is set to take the front images including the player's character object 200 from a position backward and upward relative to the player's character object. Therefore, all the displays 14-1 to 14-4 in the game machines 10-1 to 10-4 will display the respective player's character objects 200 movable within this object space as well as the front images seen from the player's character objects 200 as a game image.

When each of the machine guns 12-1 to 12-4 is swivellably moved with movement of the corresponding mount 20-1, 20-2, 20-3 or 20-4, each of the game machines 10-1 to 10-4 moves the corresponding player's character object 200 in all the horizontal directions. When a machine gun 12 is turned around, the player's character object 200 can be directed in different directions. In such a manner, each player can enjoy the shooting game against the enemy character objects by searching a predetermined target while moving its own player's character object 200 within the object space and triggering its own machine gun 12 to fire imaginary bullets.

Figure 3:
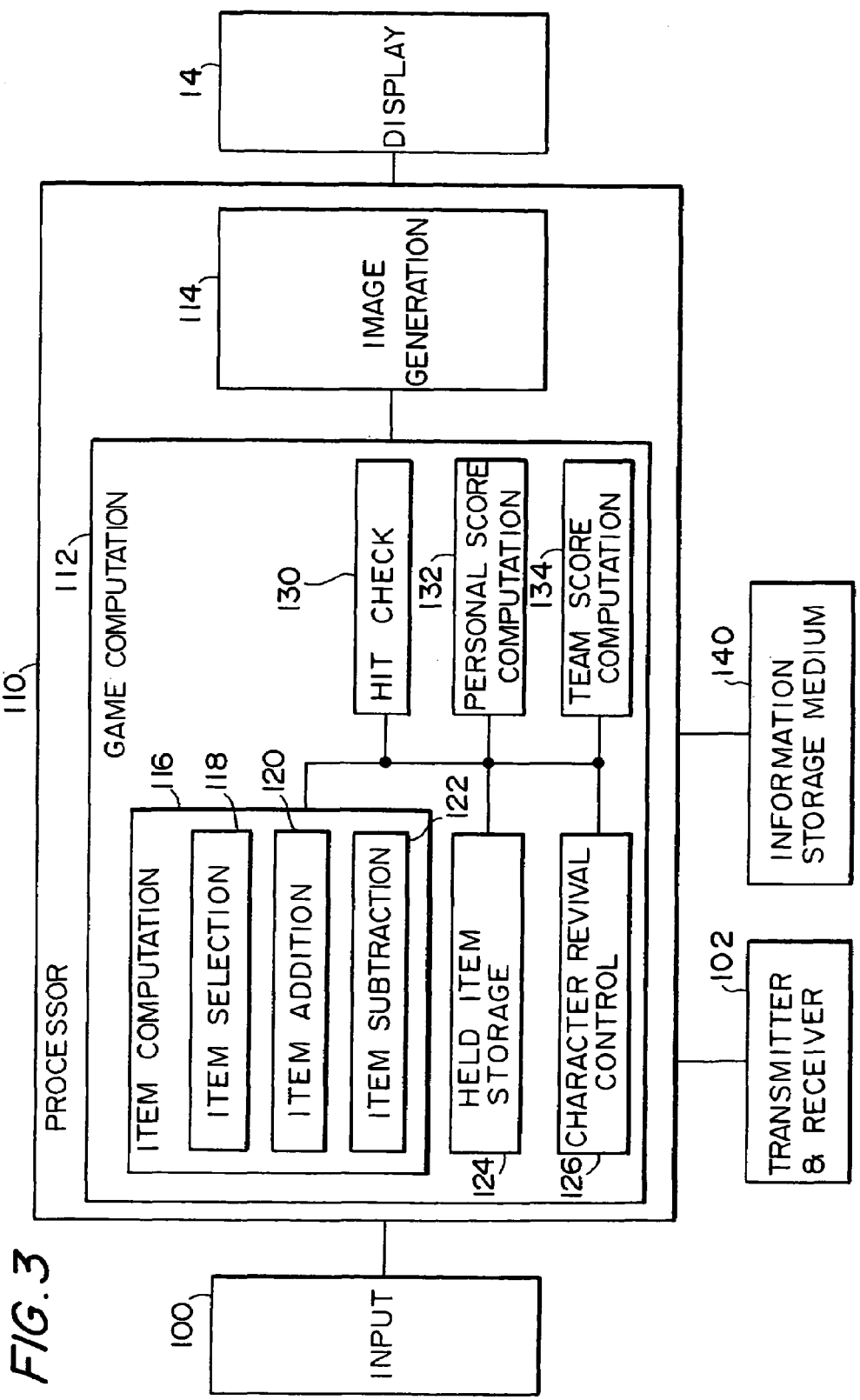
FIG. 3 is a functional block diagram of the embodiment of the game apparatus.

FIG. 3 shows the functional block diagram of each of the game machines 10-1 to 10-4. Each of the game machines 10-1 to 10-4 transmits/receives data to and from the other game machines through a transmitter/receiver section 102. Thus, the multi-player shooting game can be carried out within the same object space.

The game machine comprises an input section 100 for inputting the operational data when a player manipulates, for example, a machine gun 12 as shown in FIG. 1. The inputted operational data is then put into a processor section 110.

The processor section 110 determines the position of the object within the object space and generates an image (i.e., an image taken by the virtual camera 210) in the object space which is seen from a given viewpoint in a given line-of-sight direction, in accordance with the data inputted through the input section 100 and a given program. The function of the processor section 110 may be realized by various types of hardware such as CPU (CISC type or RISC type), digital signal processor (DSP), image generating IC, or memory.

A computer-readable medium 140 stores the program and data. The function of the computer-readable medium 140 may be realized by various types of hardware such as CD-ROM, game cassette, IC card, MO, PD, DVD, hard disc, or memory. The processor section 110 will perform various processings based on the program and data from the computer-readable medium 140.

The processor section 110 comprises a game computing section 112 and an image generating section 114.

The game computing section 112 is responsive to the game data transmitted to and received from the other game machines 10 through the transmitter/receiver section 102, the input data from the input section 100 and a given game program for performing the various processings required during the game, such as setting the game mode, moving the game forward, determining the position and direction of the moving body, determining the viewpoint and line-of-sight directions, or disposing the display objects within the object space.

The image generating section 114 generates an image as seen from a given viewpoint (virtual camera 210) within the object space set by the game computing section 112. The generated image is displayed on display sections 14-1 to 14-4.

In this embodiment, the game computing section 112 performs computation for the game in which a player's character object 200 controlled by a player attacks an enemy character object by shooting to compete for items held by each character within a given three-dimensional object space. In this embodiment, the items are in the form of medal objects for which the players compete.

Therefore, the game computing section 112 includes an item computing portion 116, an item data storing portion 124, a character revival control portion 126, a hit check portion 130, a personal score computing portion 132 and a team score computing portion 134.

The hit check portion 130 determines whether or not a shot from each character object hits an enemy character object within the object space and also determines whether or not that enemy character object is defeated by the shot.

The item data storing portion 124 stores data relating to items held by the respective character objects. In this embodiment, the number of items held by each character object is stored in the item data storing portion 124 as item data.

When a character object is defeated, the item computing portion 116 selects and displays prize items from items held by the defeated character object in accordance with a predetermined rule. In this embodiment, the prize items are displayed as medal objects. The item computing portion 116 adds the prize items to the items held by a character object who has defeated that character object and subtracts the prize items from the items held by the defeated character object in accordance with a given rule. Based on the results of addition and subtraction, thus, the item computing portion 116 updates the data in the item data storing portion 124. In this embodiment, simply, the number of prize items is added or subtracted.

The character revival control portion 126 revives the defeated character object within the object space under a predetermined condition.

The personal score computing portion 132 determines the ranking of the character objects at the end of the game, based on the number of items held by each character object.

The team score computing portion 134 determines the result of the game at the end of the game, based on the total number of items held by the character objects of each team.

In this embodiment, the item computing portion 116 includes an item selection part 118, an item addition part 120 and an item subtraction part 122.

The item selection part 118 selects prize items from items held by a character object in accordance with a predetermined rule after it is determined that that character object has been defeated by any other character object. Medal objects representing the selected prize items are arranged around the defeated character object and displayed for a predetermined time.

In this embodiment, 80% of the items (or medal objects) held by a defeated character object are set as the prize items. As shown in FIG. 4B, for example, the prize items 220 may be divided into four groups and separately displayed around a defeated character object 210 as medal objects.

Figure 4A:
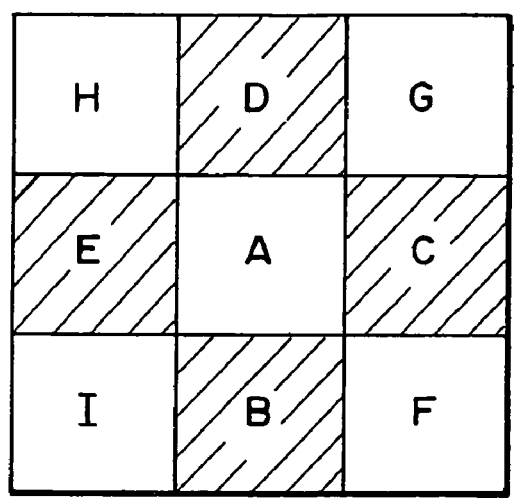
FIG. 4A illustrates separate display areas for items.
Figure 4B:
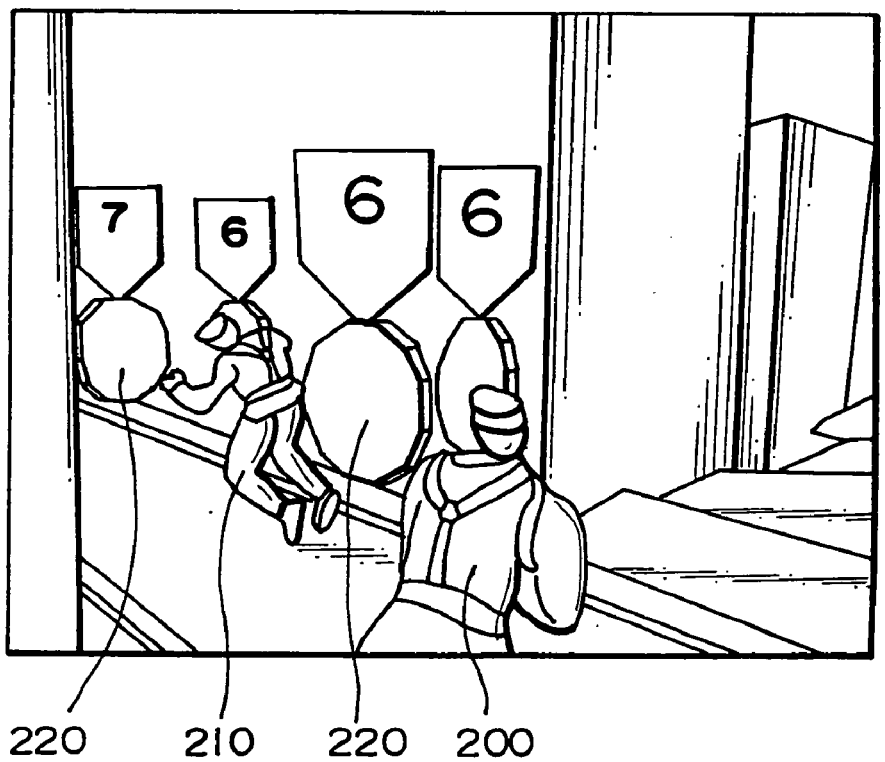
FIG. 4B illustrates a game image in which items are displayed in the separate display areas.

FIG. 4A shows a rule used to separately display the prize items 220. In this embodiment, eight areas B to I are set in a matrix around an area A in which the defeated character object is located. The prize items 220 are divided into four groups which are separately displayed at the areas B–E around the area A. The number of these display areas may be changed, if necessary.

The item addition part 120 determines that a prize item 220 being displayed is acquired by a character object when the prize item 220 is touched by that character object, and then adds the acquired item to the items held by that character object. After the defeat, the prize items 220 are displayed for a given time (e.g., nine seconds) and disappeared after they blink for the last two seconds. Only by performing a predetermined item-acquiring action, for example touching to the medal object in this embodiment, the character object can get the prize items and add them to its own items. If the character object does not perform the item-acquiring action, the medal objects representing the prize items 220 are disappeared and the character object cannot acquire them.

Since the prize items 220 are separately arranged at four areas in this embodiment, a character object who has defeated any enemy character object has to pass through the four areas and touch the medal objects efficiently within 9 seconds in order to acquire all of the prize items 220. Thus, the game can be improved in tension and interest by making the item-acquiring action more difficult.

Since the difficulty of acquiring the prize items increases as the number of areas in which the medal objects are displayed increases, the item selection part 118 may change the position and number of the display areas, if necessary. For example, the number of display areas may be smaller in the first half of the game, and may be increased in the second half when the player becomes experienced.

After a character object has been defeated, the item subtraction part 122 subtracts the prize items from the items held by the defeated character object in accordance with a predetermined rule. Since 80% of the items are set as the prize items in this embodiment, 20% of the items are left as the items held by the defeated character object.

The character revival control portion 126 makes the defeated character object disappeared from the object space and revives that character object after a given time has passed. The revived character object will have items set by the item subtraction part 122.

FIG. 5 shows a flowchart illustrating the operation of the game apparatus according to this embodiment. FIGS. 6 to 10 show examples of game images which are displayed on the displays 14-1 to 14-4 from the start to the end of game.

By the game apparatus of this embodiment, a maximum of four players can play the game and compete with each other in two teams.

Each of the players tries to defeat enemies and to acquire medal objects from the defeated enemies. If the number of items is increased, his or her score also increases, leading to increase of the team score.

It is only a machine gun 12 that can be used by each of the players during the game. The machine gun 12 is designed not to hit any ally team member. A character object hit and defeated by the machine gun may be repeatedly revived during the game.

When an enemy character object is defeated, some of the items held by the defeated enemy appear thereabove as medal objects. These prize items 220 can be acquired by a character object who has defeated that enemy by passing through the displayed medal objects.

Similarly, when player's character object is defeated by an enemy character object, some of the items held by that player's character object will be taken by the enemy character object.

At the end of the game, the number or items or each team decides the result of the game. The personal score is also determined by the number of items held by each of the players.

As the game is started, a team selection image shown in FIG. 6A is first displayed on the displays 14-1 to 14-4 of the game machines 10-1 to 10-4. Each player selects "green" or "white" team (step S10). Each of the "green" and "white" teams is formed by four character objects. In addition to four character objects (fighter objects) controlled by four players, there are four other character objects (fighter objects) controlled by the computer within the object space. After the teams is selected at the step S10, the character objects controlled by the computer are provided and teams are automatically arranged such that each team includes four character objects.

After selection of the teams, an image showing instructions for the game is displayed as shown in FIG. 6B. Thus, the players can understand the contents of the game.

At step S12, four items are provided to each of all the eight character objects.

Subsequently, at step S14, the game is started, and an image of a player's character object 200 controlled by each player seen by the virtual camera 210 of FIG. 2 is displayed on the respective one of the displays 14-1 to 14-4 of the game machines 10-1 to 10-4, as a game image shown in FIG. 6c, for example. Each of the players moves its own machine gun 12-1, 12-2, 12-3 or 12-4 in all the horizontal directions and turns it leftward or rightward to move the character object freely within the object space for searching enemies.

FIG. 6D shows a game image in which an enemy character object 210 appears in front of a player's character object. The player manipulates its own machine gun to set its sights on that enemy before the machine gun is triggered by the player. Then a game image as shown in FIG. 7A is displayed.

At step S16, it is determined whether or not such an attack has defeated the enemy character object 210.

If it is determined that the attack has defeated the enemy character object 210, 80% of the items held by the defeated enemy character object 210 (wherein points below the decimal point being rounded off) are selected as prize items at the step S11.

These prize items 220 are separately displayed as medal objects around the enemy character object 210 as shown in FIG. 7B (step S20).

At this time, the prize items 220 will separately be provided at the four areas B–E around the area A at which the enemy character object is located, as shown in FIG. 4A. In FIG. 7B, three medal objects are separately displayed at three areas B, C and D.

Since the medal objects are displayed for about nine seconds, the player must move its own character object 200 to take the item-acquiring action and pass the areas B. C and D within nine seconds, as shown in FIGS. 7C and 7D. If the player successfully performs the item-acquiring action (step S22), he or she can acquire the prize items 220 (step S24). The acquired items 220 are added to the items held by the player's character object 200. If all of the prize items displayed as medal objects at the areas have been acquired, the player's character object takes an action that indicates successful acquisition as shown in FIG. 8A.

The defeated enemy character object 210 is automatically disappeared from the object space and then revived in the object space at a predetermined place after passage of a given time. The number of items held by the revived character object is equal to the number of items left after the subtraction of the prize items (steps S26 and S28).

FIGS. 8B–8D and 9A–9C show some game images illustrating a player's character object 200 attacked by an enemy character object 210.

As shown in FIG. 8B, for example, it is now assumed that a player's character object 200 is suddenly attacked. If the player's character object 200 is directed to the direction of attack as shown in FIGS. 5C and 5D, the player can see an enemy character object 210 attacking the player's character object 200.

If a predetermined damage is applied to the player's character object 200, it will be defeated by the enemy as shown in FIG. 9A. Then, the prize items 220 will separately be displayed around the defeated player's character object 200 as medal objects as shown in FIGS. 9B and 9C (steps S18 and S20). As the enemy character object 210 touches these medal objects, the prize items 220 will be acquired by the enemy (steps S22 and S24).

At this time, the number of items hold by the player's character object 200 is reduced to about 20% of the number of items held before defeat (step S26). The defeated player's character object 200 will be revived in the object space after passage of a given time as shown in FIG. 9D (stop S28).

Such a shooting game competing for items will be played until the end of a predetermined game time. For several seconds before the end of the game, the game time is counted down on the displays 14-1 to 14-4 as shown in FIGS. 10A and 10B.

If it is determined at step S30 that the game is ended, the result of the game is decided and displayed based on the total number of items held by the character objects of each team, as shown in FIG. 10C. Thereafter, the score of each character object will be displayed based on the number of items held by each of the character objects as shown in FIG. 10D (step s32).

According to this embodiment, thus, the combined shooting/medal-acquiring game apparatus can be realized which can be improved in tension and interest and will not become dull through many repeated plays without damaging the easy understanding of the shooting game.

A structure of hardware by which this embodiment can be realized will now be described with reference to FIG. 11.

Figure 11:
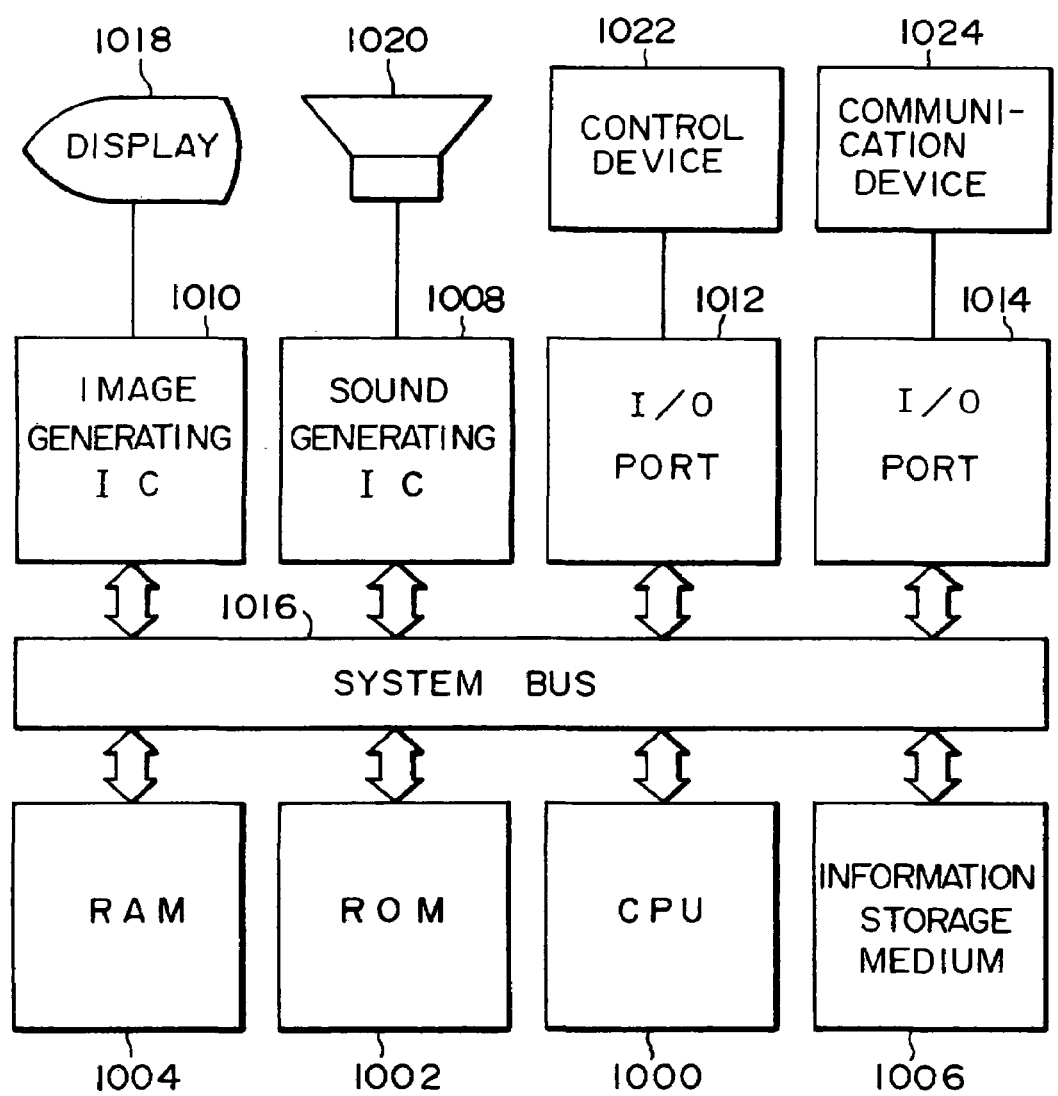
FIG. 11 illustrates a hardware arrangement that can be realized by this embodiment.

The system shown in FIG. 11 comprises a CPU 1000, a ROM 1002, a RAM 1004, a computer-readable medium 1006, a sound generating IC 1008, an image generating IC 1010 and I/O ports 1012, 1014 all of which are interconnected through a system bus 1016 for data transmission/reception. The image generating IC 1010 is connected to a display 1018; the sound generating IC 1008 to a speaker 1020; one of the I/O ports 1012 to a control device 1022; and the other I/O port 1014 to a communication device 1024.

The computer-readable medium 1006 stores programs, image data for displaying objects, sound data and so on. For example, a domestic game apparatus may utilize any of CD-ROM, game cassette, DVD and the like as a computer-readable medium for storing the game programs and others. An arcade game apparatus may utilize any memory such as ROM or the like. In, the latter case, the computer-readable medium 1006 becomes the ROM 1002.

The control device 1022 corresponds to a game controller, control panel or the like and is used for a player to input the results of judgement obtained in the progress of the game into the main body.

The CPU 1000 controls the entire system and process various data in accordance with a program in the computer-readable medium 1006, a system program (information of system initialization and so on) stored in the ROM 1002, and input signals and others from the control device 1022. The RAM 1004 is a storage means used as working area or the like and which stores the contents in the computer-readable medium 1006 and ROM 1002 or the results of computation from the CPU 1000. The data structure having a logical structure for realizing this embodiment of the present invention will be constructed on the RAM or computer-readable medium.

Furthermore, such a type of game apparatus has the sound and image generating IC's 1008, 1010 which output preferred game sounds and images. The sound generating IC 1008 is an integrated circuit for generating game sounds such as sound effects and background music, based on the information stored in the computer-readable medium 1006 and ROM 1002. The generated gate sounds are outputted through the speaker 1020. The image generating IC 1010 is an integrated circuit for generating pixel information to be outputted to the display 1018, based on the image information from the RAM 1004. RON 1002, computer-readable medium 1006 and the like. The display 1018 maybe in the form of a so-called head mount display (HMD).

The communication device 1024 sends and receives various types of information utilized in the interior of the game apparatus to and from the outside. The communication device 1024 is connected to the other game apparatus and utilized to transmit and/or receive given information in accordance with the game program, to transmit and/or receive information such as game programs and the like through the communication line.

Various processes described in connection with FIGS. 1 to 10 can be accomplished by the computer-readable medium 1006 storing the program for performing the processes shown in the flowchart of FIG. 5, the CPU 1000 actuated according to such a program, the image generating IC 1010, the sound generating IC 1018 and so on. Note that the processes performed by the image generating IC 1010, the sound generating IC 1008 and the like may be made by the CPU 1000 or a general-purpose DSP in a software manner.

FIG. 1 shows an example of an arcade game apparatus to which this embodiment of the present invention is applied. In such a case, the CPU, image generating IC and sound generating IC are mounted on a system board 1106 included in the game apparatus. A memory 1108 that is a computer-readable medium on the system board 1106 includes various information for the game in which a player's character controlled by a player fights against an enemy character to compete for items within a predetermined game space, such as first information for selecting and displaying at least one prize item from items held by a defeated character in accordance with a predetermined rule when one of the player's and enemy characters is defeated; second information for adding the prize item to items held by a winner character; third information for subtracting the prize item from items held by the defeated character in accordance with a predetermined rule; or fourth information for reviving the defeated character under a predetermined condition, items of the defeated character having been reduced. This information will be referred to stored information. The stored information includes at least one of program code, image information, sound information, information of object forms, table data, list data and player information for performing various processes mentioned above.

Figure 12A:
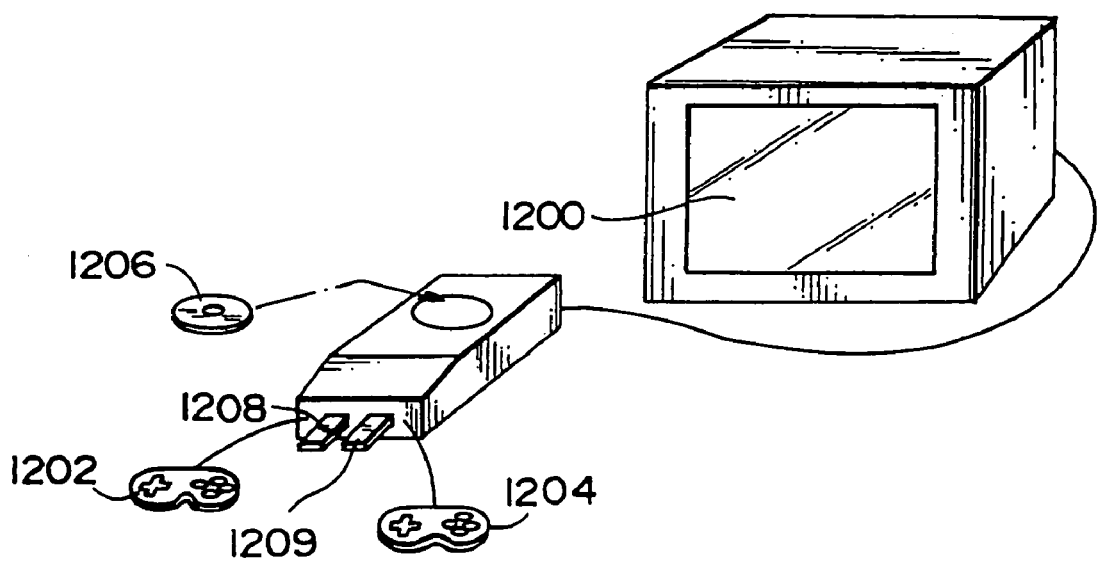
FIG. 12 illustrates other embodiments of the present invention.

FIG. 12A shows an example of the domestic game apparatus to which this embodiment of the present invention is applied.

A player enjoys a game by manipulating game controllers 1202 and 1204 while viewing a game image on a display 1200. In this case, the aforementioned stored information has been stored in CD-ROM 1206. IC cards 1208, 1209 and the like which are information storage media detachably mounted to the main system.

Figure 12B:
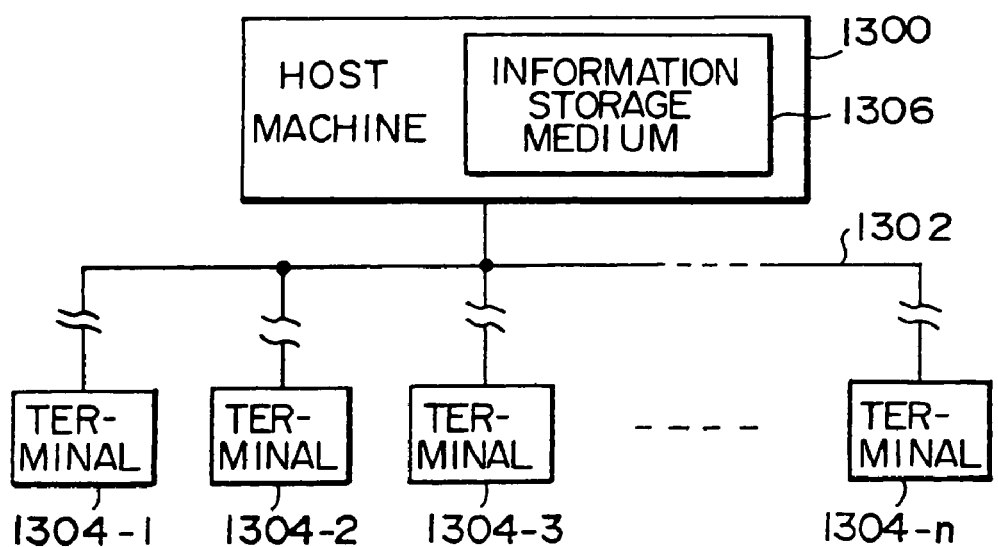

FIG. 12B shows a game apparatus according to this embodiment which includes a host device 1300 and a plurality of terminals 1304-1 to 1304-n connected to the host device 1300 through a communication line 1302. In this case, the aforementioned stored information has been stored in a computer-readable medium 1306 which is anyone of magnetic disc, magnetic tape, memory or the like which can be controlled by the host device 1300. If each of the terminals 1304-1 to 1304-n can be used as a stand-alone machine which comprises a CPU, an image generating IC and a sound generating IC and is designed to generate game images and game sounds, a game program or the like for generating the game images and game sounds is fed from the host device 1300 to the terminals 1304-1 to 1304-n. On the other hand, if the terminals is not in the form of stand-alone machine, the host device 1300 generates the game images and sound images which are in turn fed to the terminals 1304-1 to 1304-n.

The present invention is not limited to the aforementioned embodiment, but may be carried out in various other modifications.

Although the aforementioned embodiment has been described as to the item acquiring game directly affecting the results of the game, the items may be replaced by other items indirectly affecting the game result such as items for attacking the enemies or items for defending, if necessary.

Although the embodiment of the present invention has been described as to the shooting game, the present invention is not limited to such a game, but may be applied to an unarmed combat game which the player's character competes with the enemy character.

What claimed is:

1. A game apparatus for enabling a player to play a game in which the player's character controlled by the player fights against an enemy character within a predetermined three-dimensional (3D) game space, said game apparatus comprising:
   a display apparatus that displays said 3D game space as a game image which is viewed in relation to the player's character;
   storage means for storing item data relating to items held by said player's and enemy characters;
   item computation means for:
      selecting at least one prize item from items held by a defeated character in accordance with a predetermined rule after one of said player's and enemy characters has defeated the other;
      displaying said prize item in relation to a defeated character in said 3D game space so that characters other than the defeated character may acquire said prize item;
      adding said prize item to items held by a character who acquires said prize item;
      subtracting said prize item from items held by the defeated character in accordance with a predetermined rule; and
      updating said item data in said storage means based on the results of addition and subtraction; and
   character revival control means for reviving said defeated character in said game space under a predetermined condition, wherein said player's and enemy characters compete for items, wherein said prize item selection means displays said prize item for a predetermined time; and wherein
   said item addition means adds said prize item to items held by a character who has performed a predetermined item-acquiring action within said predetermined display time.

2. The game apparatus as defined in claim 1, wherein said item computation means comprises:
   prize item selection means for selecting at least one prize item from items held by a defeated character in accordance with a predetermined rule after one of said player's and enemy characters has defeated the other and for displaying said prize item in relation to the defeated character in said 3D game space so that characters other than the defeated character may acquire said prize item;
   item addition means for updating said item data by adding said prize item to items held by a character who acquires said prize item; and
   item subtraction means for updating said item data by subtracting said prize item from items held by the defeated character in accordance with a predetermined rule.

3. The game apparatus as defined in claim 2,
   wherein said prize item selection means selects said prize item from items held by the defeated character in the predetermined proportion; and
   wherein said item subtraction means sets remaining items that have not been subtracted from items held by the defeated character as new items for the defeated character when the defeated character revives.

4. The game apparatus as defined in claim 1,
   wherein said prize item selection means selects said prize item from items held by the defeated character in the predetermined proportion; and
   wherein said item subtraction means sets remaining items that have not been subtracted from items held by the defeated character as new items for the defeated character when the defeated character revives.

5. The game apparatus as defined in claim 1, further comprising means for determining the ranks of said player's and enemy characters according to the number of items held by said characters at the end of the game.

6. The game apparatus as defined in claim 1,
   wherein a plurality of players compete with each other by separating into ally and enemy teams; and
   wherein said game apparatus further comprises means for determining the result of the game according to the number of items held by said ally and enemy teams at the end of the game.

7. A game apparatus for enabling a player to play a game in which the player's character controlled by the player fights against an enemy character within a predetermined three-dimensional (3D) game space, said game apparatus comprising:
   a display apparatus that displays said 3D game space as a game image which is viewed in relation to the player's character;
   storage means for storing item data relating to items held by said player's and enemy characters;
   item computation means for:
      selecting at least one prize item from items held by a defeated character in accordance with a predetermined rule after one of said player's and enemy characters has defeated the other;
      displaying said prize item in relation to a defeated character in said 3D game space so that characters other than the defeated character may acquire said prize item;
      adding said prize item to items held by a character who acquires said prize item;
      subtracting said prize item from items held by the defeated character in accordance with a predetermined rule; and
      updating said item data in said storage means based on the results of addition and subtraction; and
   character revival control means for reviving said defeated character in said game space under a predetermined condition, wherein said player's and enemy characters compete for items
   wherein said prize item selection means divides said prize items into a plurality of groups for displaying in a plurality of display areas; and
   said item addition means adds said prize items in said display areas indicated by a predetermined item-acquiring action performed by a character to items held by that character.

8. A computer-readable medium for storing information for a game in which a player's character controlled by a player fights against an enemy character to compete for items within a predetermined three-dimensional (3D) game space, wherein said information comprises:
   display information to display the 3D game space as a game image viewed in relation to the player's character;

first information for selecting at least one prize item from items held by a defeated character in accordance with a predetermined rule after one of said player's and enemy characters has defeated the other, and for displaying said prize item in relation to a defeated character in said 3D game space so that characters other than the defeated character may acquire said prize item;

second information for adding said prize item to items held by a character who acquired said prize item;

third information for subtracting said prize item from items held by the defeated character in accordance with a predetermined rule; and fourth information for reviving the defeated character under a predetermined condition, items of the defeated character having been reduced, wherein said first information includes information for displaying said prize item for a predetermined time; and wherein said third information includes information for adding said prize item to items held by a character who has performed a predetermined item-acquiring action within said predetermined display time.

9. The computer-readable medium as defined in claim 8, wherein said first information includes information for selecting said prize item from items held by the defeated character in the predetermined proportion; and wherein said third information includes information for setting remaining items that have not been subtracted from items held by the defeated character as new items for the defeated character when the defeated character revives.

10. The computer-readable medium as defined in claim 8, wherein said information for the game further comprises information for determining the ranks of said player's and enemy characters according to the number of items held by said characters at the end of the game.

11. The computer-readable medium as defined in claim 8, wherein said information for the game further includes:

information for causing a plurality of players to compete with each other by separating into ally and enemy teams; and information for determining the result of the game according to the number of items held by said ally and enemy teams at the end of the game.

12. A computer-readable medium for storing information for a game in which a player's character controlled by a player fights against an enemy character to compete for items within a predetermined three-dimensional (3D) game space, wherein said information comprises:

display information to display the 3D game space as a game image viewed in relation to the player's character;

first information for selecting at least one prize item from items held by a defeated character in accordance with a predetermined rule after one of said player's and enemy characters has defeated the other, and for displaying said prize item in relation to a defeated character in said 3D game space so that characters other than the defeated character may acquire said prize item;

second information for adding said prize item to items held by a character who acquired said prize item;

third information for subtracting said prize item from items held by the defeated character in accordance with a predetermined rule; and fourth information for reviving the defeated character under a predetermined condition, items of the defeated character having been reduced wherein said first information includes information for dividing said prize items into a plurality of groups for displaying in a plurality of display areas; and said second information includes information for adding said prize items in said display areas indicated by a predetermined item-acquiring action performed by a character to items held by that character.

* * * * *